(12) United States Patent

Machida et al.

(10) Patent No.: US 9,480,041 B2
(45) Date of Patent: Oct. 25, 2016

(54) LOCATION INFORMATION REGISTRATION METHOD AND MOBILE COMMUNICATION TERMINAL

(71) Applicant: NTT DOCOMO, INC., Chiyoda-ku, Tokyo (JP)

(72) Inventors: Keiji Machida, Tokyo (JP); Itsuma Tanaka, Tokyo (JP); Yuusuke Okazaki, Tokyo (JP); Kazuo Sugiyama, Tokyo (JP)

(73) Assignee: NTT DOCOMO, INC., Chiyoda-ku, Tokyo (JP)

( * ) Notice: Subject to any disclaimer, the term of this patent is extended or adjusted under 35 U.S.C. 154(b) by 0 days.

(21) Appl. No.: 14/898,318

(22) PCT Filed: May 29, 2014

(86) PCT No.: PCT/JP2014/002860
§ 371 (c)(1),
(2) Date: Dec. 14, 2015

(87) PCT Pub. No.: WO2014/203467
PCT Pub. Date: Dec. 24, 2014

(65) Prior Publication Data
US 2016/0150495 A1 May 26, 2016

(30) Foreign Application Priority Data
Jun. 21, 2013 (JP) .................................. 2013-130888

(51) Int. Cl.
*H04W 4/00* (2009.01)
*H04W 68/00* (2009.01)
(Continued)

(52) U.S. Cl.
CPC .......... *H04W 60/005* (2013.01); *H04W 48/18* (2013.01); *H04W 60/00* (2013.01); *H04W 60/04* (2013.01); *H04W 88/06* (2013.01)

(58) Field of Classification Search
CPC ..... H04W 4/24; H04W 36/14; H04W 60/00; H04W 28/06

USPC ........................ 455/432.1, 435.2, 435.3, 458
See application file for complete search history.

(56) References Cited

U.S. PATENT DOCUMENTS 5,670,950 A * 9/1997 Otsuka .................... H04W 4/24
379/225
6,018,573 A * 1/2000 Tanaka .................... H04Q 3/005
342/457
(Continued)

FOREIGN PATENT DOCUMENTS

JP  2011-135470 A  7/2011
JP  2012-129956 A  7/2012

OTHER PUBLICATIONS

PCT/JP2014/002860, International Preliminary Report on Patentability (PCT/IB/373) dated Dec. 22, 2015, enclosing English Translation of Written Opinion of the International Searching Authority (PCT/ISA/237) (Five (5) pages).
(Continued)

*Primary Examiner* — William D Cumming
(74) *Attorney, Agent, or Firm* — Crowell & Moring LLP

(57) ABSTRACT

Location information of a mobile communication terminal is registered promptly. When the mobile communication terminal receives a first location registration response signal, in which a predefined value indicative of a cause of rejecting the registration of the location information is set, the mobile communication terminal transmits a location registration request signal to a second mobile communication network when there is the second mobile communication network over which the mobile communication terminal can communicate, based on the predefined value. When it is determined that there is not the second mobile communication network or the location registration of the mobile communication terminal in the second mobile communication network is not completed, the mobile communication terminal carries out a first location registration operation of retransmitting the location registration request signal to the first mobile communication network.

10 Claims, 7 Drawing Sheets

(51) Int. Cl.
*H04W 60/00* (2009.01)
*H04W 48/18* (2009.01)
*H04W 60/04* (2009.01)
*H04W 88/06* (2009.01)

(56) References Cited

U.S. PATENT DOCUMENTS

| | | | | |
|---|---|---|---|---|
| 8,731,564 B2* | 5/2014 | Suzuki | ............ | H04W 36/14 |
| | | | | 455/432.1 |
| 2013/0189981 A1* | 7/2013 | Suzuki | ............ | H04W 36/14 |
| | | | | 455/435.2 |
| 2013/0259004 A1 | 10/2013 | Morita et al. | | |
| 2016/0150495 A1* | 5/2016 | Machida | ............ | H04W 60/00 |
| | | | | 455/435.3 |
| 2016/0174190 A1* | 6/2016 | Nishimura | ............ | H04W 28/06 |
| | | | | 455/458 |

OTHER PUBLICATIONS

PCT/JP2014/002860, Notification of Transmittal of Translation of the International Preliminary Report on Patentability (Chapter I or Chapter II) (PCT/IB/338) dated Dec. 30, 2015 (One (1) page).
3GPP TS 24.008 V11.6.0 (Mar. 2013), $3^{rd}$ Generation Partnership Project; Technical Specification Group Core Network and Terminals; Mobile radio interface Layer 3 specification; Core network protocols; Stage 3 (Release 11), 678 pages, 2013.

* cited by examiner

LOCATION INFORMATION REGISTRATION METHOD AND MOBILE COMMUNICATION TERMINAL

TECHNICAL FIELD

The present invention relates to a location information registration method of registering location information of a mobile communication terminal in a mobile communication network, and a mobile communication terminal.

BACKGROUND ART

Mobile communication terminals need to be located in mobile communication networks to start communication. For this purpose, when a mobile communication terminal is powered on or moves to a different area from the area where it was located until then, an attach request signal (Attach Request) is transmitted to a mobile management node through a base station. Then, by the mobile management node transmitting the attach request signal from the mobile communication terminal to a subscriber information server on a higher level of the mobile management node, the location information of the mobile communication terminal is registered and managed in the subscriber information server.

These years, however, the coverage areas (cells) of plural mobile communication networks (PLMN: Public Land Mobile Network) are formed to overlap each other. Therefore, the mobile communication terminals accessible to such plural mobile communication networks are widely used. For example, as existing mobile communication networks, there are 2G (2nd Generation: the second-generation mobile communication system) networks such as GERAN (GSM EDGE Radio Access Network (GSM is a registered trademark of GSM Association), and 3G (3rd Generation: the third-generation mobile communication system) networks such as UTRAN (Universal Terrestrial Radio Access Network). In the 2G/3G networks, both services of voice call and data communication are available.

In addition, to realize higher-speed data communication than the 2G/3G networks, there are 4G (4th-generation) networks such as EUTRAN (Evolved Universal Terrestrial Radio Access Network). In such 4G networks, as high-speed data communication services are available, the mobile communication terminal supporting the 4G network are connected to a 4G network in priority. When a mobile communication terminal located in a 4G network starts a voice call now by using a voice call service, the mobile communication network where the mobile communication terminal is located is switched to a 2G/3G network from the 4G network, and then the voice call communication is carried out via the 2G/3G network. Accordingly, the voice call service utilizing the 2G/3G network is made available to the mobile communication terminal.

In such a situation, when a mobile communication terminal transmits the attach request signal for making a request of location registration to a mobile management node of the mobile communication network where the mobile communication terminal communicates, the location registration is not enabled by a factor caused by the network side, in some cases. As a factor caused by the network side, for example, there is a network failure that a session between the mobile management node and a network device on a higher-level than the mobile management node cannot be established by a failure in a transmission path between the mobile management node and such a higher-level network device.

When the location registration of the mobile communication terminal cannot be made, the mobile communication terminal cannot make a voice call. In this case, the mobile management node makes a response of an attach rejection signal (Attach Reject), in which "Cause value" that is a value indicative of a cause of rejecting the location registration process is set, to the mobile communication terminal. Then, the mobile communication terminal transmits an attach request signal to another mobile communication network, or continuously transmits the attach request signal to the same mobile communication network, so as to complete the location registration. When the mobile communication terminal is capable of making the location registration via another mobile communication network, such as the 3G network of an identical carrier (communication carrier) or a mobile communication network of another communication carrier, the mobile communication terminal is allowed to make the voice call and perform the data communication. It is to be noted that the operation of the mobile communication terminal when the attach rejection signal is received is regulated in accordance with the terminal settings or the "Cause value" described in non-patent literature 1 below. Herein, the "Cause value" is a value indicative of a cause of rejecting a registration process of the location information.

As the terminal settings, "voice priority (Voice Centric)" and "data priority (Data Centric)" are regulated in the following non-patent literature 2.

The regulation of the "voice priority" is defined as a policy of giving priority to the completion of the location registration, so that an incoming voice call is made available as soon as possible. The regulation of the "voice priority" is set in a mobile phone, for example.

The regulation of the "data priority" is defined as a policy of staying in a mobile communication network superior in the data communication (that is, having a high throughput) even if the voice communication is unavailable. For example, when a 3G network and an LTE network are formed to overlap each other, trying to stay in the LTE network is defined. The regulation of the "data priority" is set in a tablet terminal, for example.

As specific operations of the mobile communication terminal in accordance with the Cause value at the time of receiving the attach rejection signal, there are following operations, for example.

As a first example of the operation of the mobile communication terminal that has received the attach rejection signal from an LTE network mobile management node, there is an operation of stopping the location registration request (transmission of attach request signal) from a mobile communication terminal for a certain period of time.

As illustrated in FIG. 7, a mobile communication terminal transmits an attach request signal to an LTE network mobile management node (MME) (S101). The LTE network mobile management node (MME) transmits the attach request signal to a subscriber information server (HSS) (S102). However, it is supposed that a failure occurs in a network of the LTE network and the location information of the mobile communication terminal cannot be registered in the subscriber information server (HSS). In this case, the attach rejection signal, in which the "Cause value" indicating that a communication unavailable state continues for a while is set, is transmitted to the mobile communication terminal (S103). As the Cause value transmitted in such a case, #42 (Severe network failure) is defined in non-patent literature 1.

In this situation, the mobile communication terminal stops the location registration request, for example, for several minutes to ten and several minutes based on the received Cause value "#42", regardless of the terminal settings of its own. Then, the mobile communication terminal selects an operation of making the location registration request again to the LTE network mobile management node, after a certain period of time has elapsed (S104). At this timing, if a network of the LTE network recovers, the mobile communication terminal can perform the location registration in the LTE network.

As a second example of the operation of the mobile communication terminal that has received the attach rejection signal from the LTE network mobile management node, there is an operation of performing the location registration by transmitting the attach request signal to the mobile management node of another mobile communication network (for example, 3G network). This operation is carried out by the mobile communication terminal that desires to give priority to the voice incoming call. In other words, this operation is carried out in the case of the "voice priority" of the terminal setting.

Although the mobile communication terminal transmits the attach request signal to the LTE network as illustrated in FIG. 8, there is no response from the subscriber information server (HSS) to the mobile management node because of a network failure or the like, the attach rejection signal, in which the "Cause value" indicative of no response is set, is transmitted to the mobile communication terminal (S111 to S113). As the Cause value transmitted in such a case, "#19" (ESM failure) is defined in non-patent literature 1.

Then, the mobile communication terminal switches the mobile communication network to the 3G network based on the received Cause value "#19" and the "voice priority" of the terminal setting, and in addition, selects an operation of invalidating the LTE network for a certain period of time (for example, dozens of minutes to several hours) (S114 to S115). Then, the mobile communication terminal performs the location registration in the 3G network (S116). This operation is carried out by the mobile communication terminal that desires to give priority to the voice incoming call. In other words, this operation is carried out in the case where the terminal setting is the "voice priority" and the Cause value that has been set to the attach rejection signal is "#19". Accordingly, the mobile communication terminal performs the location registration in the 3G network, and performs the voice communication promptly.

It is to be noted that when the "data priority" is the terminal setting of the mobile communication terminal, the mobile communication terminal tries to stay in the LTE network. For this reason, even if the mobile communication terminal receives the attach rejection signal in which the same Cause value "#19" has been set, the mobile communication terminal does not perform the location registration operation in the 3G network.

As a third example of the operation of the mobile communication terminal that has received the attach rejection signal from the LTE network mobile management node, there is an operation of continuously transmitting the attach request signal to the LTE network mobile management node which has transmitted the attach rejection signal. This operation is carried out by the mobile communication terminal that desires to give priority to the data communication. In other words, this operation is carried out in the case where the terminal setting is the "data priority".

Although the mobile communication terminal transmits the attach request signal to the LTE network, as illustrated in FIG. 9, there is no response from the subscriber information server (HSS) because of a network failure or the like, and the attach rejection signal, in which the Cause value "#19" indicative of no response is set, is transmitted to the mobile communication terminal (S121 to S123).

Then, the mobile communication terminal tries the location registration in the LTE network by transmitting the attach request signal to the LTE network mobile management node (MME) again, judging from the Cause value "#19" that has been received and the terminal setting of the "data priority" (S124). This operation is carried out by the mobile communication terminal that desires to give priority to the data communication. In other words, this operation is carried out in the case where the terminal setting is the "data priority" and the Cause value set in the attach rejection signal is "#19". When the terminal setting of the mobile communication terminal is the "data priority", the mobile communication terminal tries to be located in the LTE network having a higher throughput. For this reason, unlike the operation of the second example, the mobile communication terminal continuously transmits the attach request signal to the LTE network mobile management node. Hence, the mobile communication terminal is capable of making a location registration in the LTE network immediately after the location registration unavailable state is recovered in the LTE network.

As a fourth example of the operation of the mobile communication terminal that has received the attach rejection signal from the LTE network mobile management node, there is an operation of transmitting the attach request signal to another network mobile management node of another mobile communication network (for example, 3G network) that covers the location of the mobile communication terminal, so as to perform the location registration. This operation is carried out for the mobile communication terminal that starts communication by loaming in (a loaming-in user), in a case where there is no roaming agreement of a LTE network between a communication carrier of the user of the mobile communication terminal and a communication carrier that provides the LTE network.

In such a case, an attach rejection signal, in which the "Cause value" indicating that an appropriate coverage area (a tracking area TA) cannot be found is set, is transmitted to the mobile communication terminal. As the Cause value to be transmitted in such a case, "#15" (No suitable cells in tracking area) is defined in non-patent literature 1.

Then, the mobile communication terminal tries not to use the tracking area of the LTE network for a certain period of time (for example, ten and several hours) based on the Cause value "#15" that the mobile communication terminal has received, regardless of the terminal settings. It is to be noted that at this timing, the LTE function of the mobile communication terminal is not turned off. Then, the mobile communication terminal performs the location registration in the 3G network having the loaming agreement, and can start communication in the 3G network.

In addition, when the location registration of the mobile communication terminal in the LTE network is successful, but the location registration in the 3G network fails, a location registration completion signal in which the "Cause value" is set (Attach_Accept) is replied from the network. As the Cause value transmitted in such a case, "#18" (CS Domain Not available) is defined in non-patent literature 1.

As regulated in non-patent literature 2, when the "data priority" is set at the mobile communication terminal, the mobile communication terminal performs an operation of staying in the LTE network. On the other hand, when the "voice priority" is set at the mobile communication terminal, the mobile communication terminal performs an operation of selecting a wireless system such as a 3G network or another PLMN, by which the voice communication is made available. As described above, even when the location registration completion signal in which the "Cause value" is set is replied, the mobile communication terminal performs an operation that is regulated based on the "Cause value".

In addition, when it is allowed to give the location registration request to the PLMN of another communication carrier, an attach request signal can be transmitted to the PLMN of another communication carrier, instead of the 3G network.

CITATION LIST

Non-Patent Literature

NLT 1: 3GPP TS24.301 V11.6.0 (2013-03)
NLT 2: 3GPP TS23.221 V11.1.0 (2012-12)

SUMMARY

Technical Problem

As described above, the location registration operation of the mobile communication terminal is regulated depending on the terminal setting and the Cause value set in the attach rejection signal. However, even if the mobile communication terminal performs an existing operation currently regulated, there are cases where it is impossible to make the location registration of the mobile communication terminal. For example, there is a case where the mobile communication terminal gives the location registration request to the 3G network, but a network failure is also occurring in the 3G network.

In this case, a network device of the 3G network (for example, RNC: Radio Network Controller) instructs an LTE-supporting terminal to perform the location registration in the LTE network. However, for example, as described in the second method, since a network failure is occurring in the LTE network, when the location registration request destination of the mobile communication terminal is switched to the 3G network, the operation of invalidating the LTE function of the mobile communication terminal for a certain period of time is regulated.

For this reason, as far as the network failure in the 3G network continues, the mobile communication terminal cannot perform the location registration in the 3G network, no matter how many times the mobile communication terminal gives the location registration request. However, even if a network failure occurs in the LTE network and a mobile management node transmits the attach rejection signal to the mobile communication terminal, a factor by which the location registration is made unavailable (a network failure or the like) is recovered soon, in some cases.

In addition, in the LTE network, plural units including the mobile management node (MME) and a higher-level network device (S-GW (Serving Gateway), P-GW (Packet data network GateWay), or the like) cover the identical area. Therefore, depending on the place where the failure occurs, the location registration is sometimes made available by merely retransmitting the attach request signal.

The mobile communication terminal, however, cannot give the location registration request to the LTE network, until a certain period of time that is set at the time of switching to the 3G network elapses. Thus, there is a problem that in the case where the network failure is occurring in the 3G network for a long time, the location registration of the mobile communication terminal cannot be performed for a long time.

Besides, the configuration, in which when the location registration cannot be performed in a certain mobile communication network, the location registration is performed by switching to another mobile communication network, is based on the fact that plural mobile communication networks are formed to overlap each other.

There is a mobile communication terminal, however, located in an area where the plural mobile communication networks do not overlap each other. When the location registration process of this mobile communication terminal fails, the above-described location registration operation is applied to the mobile communication terminal. This causes a problem that the location registration request cannot be given to the mobile communication network (for example, the LTE network) in which the location registration process has failed once, until a certain period of time elapses, and therefore, the location registration of the mobile communication terminal cannot be performed for a long time.

For the time being, in order to provide the voice communication service to the mobile communication terminal, even if the mobile communication terminal is located in the LTE network, the mobile communication network where the mobile communication terminal is located is switched from the LTE network to the 2G/3G network, by all means. Accordingly, an outgoing voice call from the mobile communication terminal is made via the 2G/3G network.

Therefore, in the existing standardization specifications, as a terminal operation regulation for every Cause value to the mobile communication terminal set to the "voice priority", the location registration destination of the mobile communication terminal is switched to the 3G network side and the location registration in the LTE network is made unavailable for a certain period of time. This is based on the fact that the coverage areas (cells) of plural (LTE, 3G, and the like) mobile communication networks (PLMN) are formed to overlap each other, and the service continuity to the voice communication service is supplemented. To put it the other way around, when the location registration in the 3G network is unavailable, even if the location registration in the LTE network is available, the voice communication service itself cannot be provided. Therefore, it is considered that the above-described terminal operation regulation is set for the mobile communication terminal that is set to the "voice priority".

In a VoLTE (Voice over LTE) network, however, which is proposed as a method of providing the voice service in the LTE network these years, a handover to the 3G network is unnecessary at the time of making an outgoing voice call and the above-described overlay of another mobile communication network is no longer a precondition. Accordingly, there is a problem in that "also in a state where the voice service is available, the service cannot be provided for a certain period of time in accordance with the terminal operation setting", and there is a high possibility that the above-mentioned problem becomes serious.

Such a location information registration method is one of the standardization specifications regulated by the 3GPP (Third Generation Partnership Project), which is a standardization organization. In consideration of changes or the like in facility installation situation, however, the above-described problems cannot be solved by the existing regulations, and there is a need to set a new location information registration method.

Thus, the present invention has been made to solve the problems that cannot be solved by the existing regulations in the standardization specifications of the standardization organization, and has an object to realize a location registration method, by which the location information registration of the mobile communication terminal can be performed promptly, and a mobile communication terminal.

Solution to Problem

In consideration of the above-mentioned problems, "when the location registration of a mobile communication terminal in a first mobile communication network is rejected, the mobile communication terminal transmits the location registration to a second mobile communication network, which is different from the first mobile communication network by which the location registration of the mobile communication terminal is rejected. However, there is a case that there is no second mobile communication network or a case where the location registration is also rejected by the second mobile communication network. For such a case, an operation regulation is added such that a mobile communication terminal gives a location registration request to the first mobile communication network again by which the location registration has been rejected firstly". The detailed description will be given as follows.

In order to achieve the above object, in one embodiment of the present invention, there is provided a location information registration method, including:

transmitting, by a mobile communication terminal, a location registration request signal of making a registration request of location information of the mobile communication terminal, to a first mobile communication network over which the mobile communication terminal can communicate;

transmitting to the mobile communication terminal, by a first mobile management node, the location registration request signal to a first subscriber server connected with the first mobile communication network, when the first mobile management node connected with the first mobile communication network receives the location registration request signal;

transmitting, by the first mobile management node, a first location registration response signal in which a predefined value indicative of a cause of rejecting the registration request of the location information is set, when the first mobile management node determines that a registration of the location information of the mobile communication terminal cannot be completed;

transmitting, by the mobile communication terminal, the location registration request signal of the mobile communication terminal to a second mobile communication network based on the predefined value, when the mobile communication terminal receives the first location registration response signal in which the predefined value is set and when there is the second mobile communication network over which the mobile communication terminal can communicate; and carrying out a first location registration operation of retransmitting the location registration request signal to the first mobile communication network, when there is not the second mobile communication network or when it is determined that a location registration of the mobile communication terminal in the second mobile communication network is not completed.

It is to be noted that the first location registration response signal is a location registration response signal in which a predefined value is set as a value indicative of a cause of rejecting the registration of the location information. The first location registration response signal includes not only the location registration rejection signal but also the location registration completion signal in which the above-described predefined value is set. In other words, the first location registration response signal includes not only the location registration rejection signal to be transmitted in the case where the location registration is rejected (location registration is unavailable) but also the location registration completion signal in which the "Cause value" is set and then transmitted, when, for example, the location registration is completed only in a packet switched domain, but the location registration in a voice circuit switched domain is not completed.

In such a configuration, it is easy to avoid the location registration of the mobile communication terminal from being unavailable for a long time.

In the above-described location information registration method, in receipt of the first location registration response signal, the mobile communication terminal may transmit the location registration request signal of the mobile communication terminal to the second mobile communication network, with a communication function of the mobile communication terminal for communicating with the first mobile communication network being valid.

In such a configuration, when an access failure occurs in the second mobile communication network for a long time, the destination mobile communication network of the mobile communication terminal can be set back promptly to the first mobile communication network in which there is a possibility of network recovery. Accordingly, it is easy to avoid the location registration of the mobile communication terminal from being unavailable for a long time.

In the above-described location information registration method, in receipt of the first location registration response signal, the mobile communication terminal may transmit the location registration request signal to the second mobile communication network, and when it is determined that the location registration of the mobile communication terminal in the second mobile communication network is completed, the mobile communication terminal invalidates the communication function of the mobile communication terminal for communicating with the first mobile communication network for a certain period of time.

In such a configuration, even if the communication network device of the second mobile communication network gives a handover request to the first mobile communication network, to the mobile communication terminal, it is possible for the mobile communication terminal not to give a connection request to the first mobile communication network having a high possibility that a network failure is occurring.

In the above-described location information registration method, when a voice communication is set in priority in a terminal setting of the mobile communication terminal, the first location registration operation may be carried out, and when the voice communication is not set in priority in the terminal setting of the mobile communication terminal, a second location registration operation of transmitting the location registration request signal to the first mobile communication network is carried out, instead of the first location registration operation, without the mobile communication terminal transmitting the location registration request signal to the second mobile communication network.

In such a configuration, the most suited location registration operation can be carried out depending on the terminal setting of the mobile communication terminal.

In the above-described location information registration method, either the first location registration operation or the second location registration operation may be selected based on the predefined value set in the first location registration response signal and the terminal setting, and the predefined value used for making the mobile communication terminal select the first location registration operation may be another predefined value, which is different from the predefined value used for making the mobile communication terminal select the second location registration operation.

In such a configuration, a new location registration operation can be defined without changing an existing regulation in the 3GPP standardization specifications. For this reason, it is possible to reduce an influence to an existing regulation in the 3GPP standardization specifications.

In addition, in another embodiment of the present invention, there is provided a mobile communication terminal communicating with at least a first mobile communication network, the mobile communication terminal including:

a communication unit configured to transmit to a first mobile communication network a location registration request signal of making a registration request of location information of the mobile communication terminal, and to receive a location registration response signal indicative of a registration state of the location information; and a location information registration request unit configured to transmit the location registration request signal of the mobile communication terminal to a second mobile communication network based on a predefined value, when it is determined that the location registration response signal is a first location registration response signal in which the predefined value is set as a value indicative of a cause of rejecting a registration process of the location information, and when there is the second mobile communication network over which the mobile communication terminal can communicate, and configured to carry out a first location registration operation of retransmitting the location registration request signal to the first mobile communication network, when it is determined that there is not the second mobile communication network or a location registration of the mobile communication terminal is not completed in the second mobile communication network.

In the above-described mobile communication terminal, when the communication unit may receive the first location registration response signal, the location information registration request unit is configured to transmit the location registration request signal of the mobile communication terminal to the second mobile communication network, with a communication function of the mobile communication terminal for communicating with the first mobile communication network being valid.

In the above-described mobile communication terminal, when the communication unit may receive the first location registration response signal, the location information registration request unit is configured to transmit the location registration request signal to the second mobile communication network, and to invalidate the communication function of the mobile communication terminal for communicating with the first mobile communication network for a certain period of time, when it is determined that the location registration of the mobile communication terminal in the second mobile communication network is completed.

In the above-described mobile communication terminal, the location information registration request unit may be configured to determine a transmission destination of the location registration request signal based on the predefined value set in the first location registration response signal and a terminal setting of a communication form to be communicated in priority, which is set in the mobile communication terminal.

In the above-described mobile communication terminal, the location information registration request unit may be configured to carry out the first location registration operation, when determining that the terminal setting is a setting of a voice call communication in priority, and the location information registration request unit is configured to carry out a second location registration operation of transmitting the location registration request signal to the first mobile network, instead of the first location registration operation, without transmitting the location registration request signal to the second mobile communication network, when it is not determined that the terminal setting is the setting of the voice call communication in priority.

Advantageous Effects

According to the present invention, it is possible to make the location information registration of the mobile communication terminal promptly.

DESCRIPTION OF EMBODIMENTS

1. First Embodiment

A mobile communication terminal and a location information registration system of registering the location information of the mobile communication terminal in a first embodiment of the present invention will be described with reference to FIG. 1 to FIG. 4. Firstly, a configuration of a location information notification system in the present embodiment will be described by using FIG. 1.

(Configuration of Location Information Registration System)

In the present embodiment, a description will be given of a location registration operation of a mobile communication terminal 30 that is connectable to both of an LTE network that is a first mobile communication network and a 3G network that is a second mobile communication network, so as to be connected to the LTE network in priority. The mobile communication terminal 30 registers the location information of the mobile communication terminal in a subscriber information server connected with the 3G network or the LTE network.

In the location information registration system 1 in the present embodiment, in an existing location of the mobile communication terminal 30, a coverage area in the LTE network (a LTE network coverage cell C1) and a coverage area in the 3G network (a 3G network coverage cell C2) are formed to overlap each other. The location registration is performed for each location registration area including plural cells. The location registration area in the LTE network is referred to as tracking area (TA: Tracking Area), and the location registration area in the 3G network is referred to as routing area (RA: Routing Area).

Figure 1:
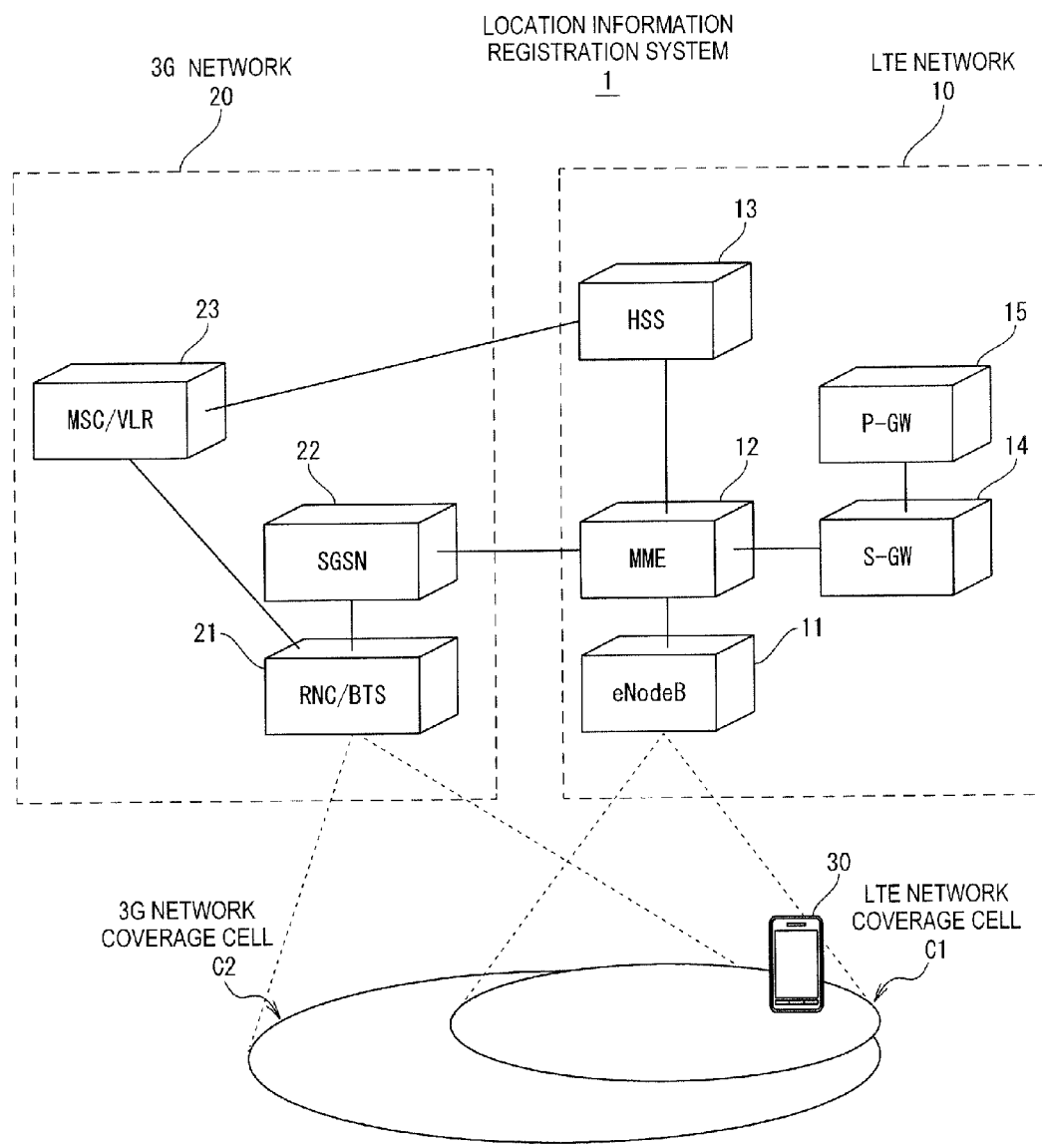
FIG. 1 is a schematic view illustrative of a location information registration system in a first embodiment of the present invention.

As illustrated in FIG. 1, the location information registration system 1 in the present embodiment includes a Radio base station (eNodeB: evolved Node B) 11, an LTE network mobile management node (MME: mobile Management Entity) 12, a subscriber information server (HSS: Home Subscriber Server) 13, an IP packet transmission control node (S-GW: Serving-Gateway) 14, an IP packet transmission control node (P-GW: Packet Data Network-Gateway) 15, a Radio base station (BTS: Base Transceiver Station)/radio network controller (RNC: Radio Network Controller) 21, a 3G network mobile management node (SGSN: Serving General packet radio service Support Node) 22, and a mobile communication controller (MSC/VLR: Mobile Switching Center/Visited Location Register) 23. It is to be noted that the MME 12 corresponds to a first mobile management node connected with the LTE network that is the first mobile communication network, The HSS 13 corresponds to a first subscriber information server connected with the LTE network that is the first mobile communication network. In the present embodiment, a communication network is configured to include at least the eNodeB 11, the MME 12, the HSS 13, the RNC/BTS 21, the SGSN 22 and the MSC/VLR 23. It is to be noted that the eNodeB 11, the MME 12, the HSS 13, S-GW 14 and the P-GW 15 are communication network devices included in the LTE network 10, and the RNC/BTS 21, the SGSN 22, and the MSC/VLR 23 are communication network devices included in a 3G network 20.

(Communication Network Device in LTE Network)

The eNodeB 11 is configured to form an LTE coverage area (coverage area cell) C1, by transmitting a cell identifier (for example, a cell ID) within a certain range. When the mobile communication terminal 30 is located in the LTE coverage area cell C1, the eNodeB 11 is capable of performing radio communication with the mobile communication terminal 30 in accordance with the LTE scheme. The mobile communication terminal 30 is configured to communicate with the MME 12 located on an upper steam (on a higher level) of the eNodeB 11 through the eNodeB 11. The eNodeB 11 has a radio access control function. For this reason, unlike the BTS 16, the eNodeB 11 is capable of directly connecting to the MME 12, which is one of the core communication network devices of the LTE scheme.

The MME 12 is one of the core communication network devices together with the S-GW 14 and the P-GW 15, and a PCRF (Policy And Charging Rules Function), not illustrated. The MME 12 is configured to perform the mobile management and authentication of the mobile communication terminal 30, and setting control of the IP transmission path with the mobile communication terminal. The MME 12 performs the mobile management of the mobile communication terminal 30 in cooperation with the HSS 13. In receipt of a location registration request from the mobile communication terminal 30, that is the attach request signal from the mobile communication terminal 30, the MME12 transmits the attach request signal to the HSS 13. The MME 12 receives terminal identification information of the mobile communication terminal 30 together with the attach request signal. The MME 12 gives a location registration request with the terminal identification information of the mobile communication terminal 30 to the HSS 13.

The MME 12 is configured to transmit a location registration response signal indicative of a result of the location registration request to the mobile communication terminal 30, depending on the result of the location registration in the HSS 13. As such a location registration response signal, there is a location registration completion signal (Attach_Accept) to be transmitted when the location registration is completed in a mobile communication network, or a location registration rejection signal (Attach_Reject) to be transmitted when the location registration is not completed. The location registration completion signal (Attach_Accept) is also transmitted, when only the location registration in a PS domain is completed from a CS (Circuit Switched) domain that processes voice calls and a PS (Packet Switched) domain that processes packet calls.

Herein, the MME 12 is configured to set the "Cause value" in the location registration rejection signal, in response to a location registration request from the mobile communication terminal 30. Also, the MME 12 is configured to determine in some cases that, for example, the location registration process of the CS domain is rejected, but the location registration in only the PS domain is completed. In such cases, the MME 12 transmits the location registration completion signal, but sets the "Cause value" indicative of a cause of rejecting the location registration process of the CS domain in the location registration completion signal. The "Cause value" is regulated in the 3GPP (Third Generation Partnership Project) (for example, see non-patent literature 1). In the first embodiment, a new "Cause value" is defined, so that based on such a new "Cause value", the mobile communication terminal 30 is configured to perform an operation for a location information registration process, which has not been regulated conventionally. The new "Cause value" and the operation of the mobile communication terminal 30 based on the new "Cause value" defined in the present embodiment will be described later.

In receipt of a location registration response signal transmitted from the HSS 13 when the location registration is completed, the MME 12 transmits the location registration completion signal to the mobile communication terminal 30. In addition, the MME12 is configured to transmit to the mobile communication terminal 30 a location registration rejection signal, in which the "Cause value" indicative of a cause of rejecting the location registration process for the CS domain is set, when the location registration is completed in only the PS domain, for example. Further, for example, when the location registration is not completed by a network failure or when it is determined that the location registration is not completed in a case where the communication using the LTE network is not permitted to the mobile communication terminal 30, the MME 12 is configured to transmit to the mobile communication terminal 30 a location registration rejection signal, in which the "Cause value" indicative of a cause of rejecting the location registration process is set. The MME 12 is configured to manage plural LTE network coverage cells, where all mobile communication terminals under control of the MME 12 are located, and to control simultaneous calls or the like to the mobile communication terminals at the time of need.

The HSS 13 includes a subscriber information management database (HLR: Home Location Register) in which subscriber information is stored, and manages the location information (coverage area information) of the mobile communication terminals, user contract information, the authentication information, and the like, as the subscriber information. The subscriber information is managed in association with the terminal identification information of the mobile communication terminal 30. In receipt of an attach request signal and the terminal identification information of the mobile communication terminal 30 from the MME 12, the HSS 13 performs the location registration with the terminal identification information. Then, the HSS 13 transmits a location registration response signal to the MME 12, when the location registration is completed. It is to be noted that the HSS 13 manages the coverage area information with an address of the mobile management node (the MME 12 or the SGSN 22) that manages the location registration area where each mobile communication terminal is located.

The S-GW 14 performs the transmission control of IP packets based on an instruction from the MME 12. The P-GW 15 is a connection point with a PDN (Packet Data Network) such as the Internet, the service control network, or the like, and performs the transmission control of the IP packets between the mobile communication terminal 30 and the PDN. It is to be noted that plural units including the MME 12, the S-GW14, and the P-GW15 cover an identical area together. Therefore, even if a network failure occurs, the location registration is completed in some cases, depending on a failure point, by the mobile communication terminal 30 making a location registration request again.

(Communication Network Device of 3G Network)

The radio base station (BTS/RNC) 21 is a node included in the 3G network. The BTS is configured to form a 3G coverage area (a coverage area cell) C2, by transmitting a cell identifier (for example, a cell ID) within a certain range. When the mobile communication terminal 30 is located in a 3G coverage area cell C2, the BTS is capable of performing radio communication with the mobile communication terminal 30 in accordance with the 3G communication scheme. The mobile communication terminal 30 is configured to communicate with the RNC via the BTS, the SGSN 22, and the MSC/VLR 23 located on an upper steam (on a higher level) of the BTS. The cell identifier is given to every base station. Therefore, by determining the cell identifier, it is possible to distinguish which base station a coverage area cell of the mobile communication terminal 30 is accommodated in. The RNC is provided to correspond to the BTS, and is configured to control the radio communication of the mobile communication terminal 30 located in the 3G coverage area cell C2 formed by the BTS. The RNC accommodates plural BTSs, and controls the location registration requests or simultaneous voice calls of plural mobile communication terminals in the 3G network. The RNC may also be referred to as base station controller, radio controller, or the like.

The SGSN 22 is configured to carry out packet switching and packet communication in the 3G network and the mobile management and the like of the mobile communication terminal 30. The MSC/VLR 23 is a circuit switched domain node of the 3G network. The MSC is a logical node which makes a circuit switched core network comply with the IP. The VLR is located between the mobile communication terminal 30 and the HSS 13, is a database temporarily storing and managing the subscriber information, and is a logical node of providing functions such as the mobile management and the like of the mobile communication terminal 30.

(Mobile Communication Terminal)

The mobile communication terminal 30 is configured to communicate with the LTE network 10 or the 3G network 20, and to transmit the attach request signal (location registration request signal) to the LTE network 10 or the 3G network 20, so as to request a registration of the location information of the mobile communication terminal 30. Then, the mobile communication terminal 30 is configured to transmit the terminal identification information of the mobile communication terminal 30 together with the attach request signal. As the terminal identification information, IMEI (International Mobile Equipment Identity), IMEISV (IMEI Software Version), or the like is used. The mobile communication terminal 30 is configured to receive a location registration response signal (Attach_Reject or Attach_Accept) indicative of a result of the location registration request from the LTE network 10 or the 3G network 20.

When the location registration is completed in the HSS 13, the mobile communication terminal 30 is capable to transmitting and receiving incoming and outgoing voice calls, and performing data communication. In addition, in order to complete the location registration in the mobile communication network, the mobile communication terminal 30 is configured to retransmit the attach request signal.

Figure 2:
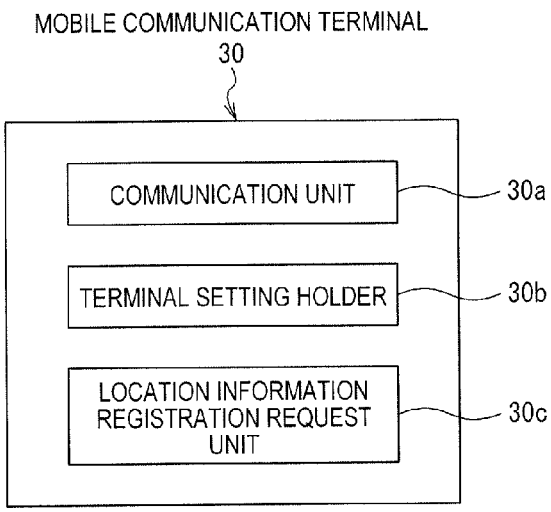
FIG. 2 is a schematic view illustrative of a mobile communication terminal in the first embodiment of the present invention.

FIG. 2 is a configuration indicative of a configuration of the mobile communication terminal 30. The mobile communication terminal 30 includes a communication unit 30a configured to communicate between the mobile communication terminal 30 and the mobile communication network, a location information registration request unit 30c configured to give a location registration request to a mobile communication network, and a terminal setting holder 30b.

The communication unit 30a is configured to transmit to the LTE network or the 3G network a location registration request signal of making a request of registration of the location information of the mobile communication terminal 30. In addition, the communication unit 30a is configured to receive a response signal to the location registration request indicative of a location registration state of the mobile communication terminal 30 from the LTE network or the 3G network, that is a location registration response signal indicative of whether or not the registration of the location information is completed, from the LTE network or the 3G network. Further, the communication unit 30a is configured to give a location information registration request of the mobile communication terminal 30, and to perform voice communication and data communication of the mobile communication terminal 30 with the outside.

The terminal setting holder 30b is configured to hold the terminal setting in which the communication form prioritized by the mobile communication terminal 30 is set. As the terminal setting, the "voice priority" (Voice Centric) or the "data priority" (Data Centric) is defined.

The "voice priority" is a terminal setting defined as a policy that the priority is given to the registration of the location information of the mobile communication terminal 30, so that an incoming voice call available state can be made as soon as possible. In addition, the "data priority" is a terminal setting defined as a policy that the mobile communication terminal 30 tries to stay in a mobile communication network having a high throughput. The "voice priority" is set as the terminal setting in a general mobile phone, whereas the "data priority" is set as the terminal setting in a tablet terminal.

The location information registration request unit 30c is configured to select which one of the LTE network or the 3G network a location registration request is given to, and to transmit the attach request signal to the selected one of the LTE network or the 3G network. The location information registration request unit 30c is configured to determine the Cause value set in the attach rejection signal received from the MME 12. In addition, the location information registration request unit 30c is configured to acquire the terminal setting held by the terminal setting holder 30b. Then, the location information registration request unit 30c is configured to perform an appropriate location registration operation based on the terminal setting and the "Cause value" received from the mobile communication network.

The mobile communication terminal 30 in the first embodiment is configured to perform a new location registration operation as represented in Table 1, in receipt of the attach rejection signal in which a newly defined Cause value "#AA" is defined in addition to the conventionally regulated "Cause value".

It is to be noted that, in the following description, it is supposed that the mobile communication terminal 30 has received the attach rejection signal in which the Cause value "#AA" is set. However, this is an example of the operation of the mobile communication terminal 30. As the location registration response signal in which the Cause value "#AA" is set, not only the attach rejection signal but also the location registration completion signal are included. For example, when the location registration is completed only in the PS domain, but the location registration is not completed in the CS domain, the location registration completion signal in which a predefined Cause value "#18" (not represented in the Table) indicative of the above fact is set is transmitted to the mobile communication terminal 30. Also when the mobile communication terminal 30 receives the location registration completion signal in which the Cause value "#18" is set, the operation is performed based on the Cause value "#18".

The following Table 1 represents the location registration operation of the mobile communication terminal 30, which is determined based on the "Cause value" set in the attach rejection signal to be transmitted to the mobile communication terminal 30 and the terminal setting of the mobile communication terminal 30. The Cause values "#15" and "#19" in Table 1 are parts of the Cause values conventionally used, and are regulated in non-patent literature 1. In addition, the Cause value "#AA" indicated in Table 1 is a Cause value, which is newly defined in the present embodiment. Herein, "AA" indicates a value that is not used as an existing Cause value. The Cause value is a value indicative of a cause of rejecting the registration process of the location information of the mobile communication terminal 30.

TABLE 1

Cause value of attach rejection signal transmitted from MME

| Terminal setting | #15 (no suited cell in TA) | #19 (no response, general error) | #AA |
|---|---|---|---|
| Voice Priority | Transmit attach request signal to 3G NW | LTE function OFF, and transmit attach request signal to 3G NW | Transmit attach request signal to 3G NW or another PLMN →LTE function OFF, in success →transmit to LTE in failure |
| Data Priority | Transmit attach request signal to 3G NW | Transmit attach request signal to LTE NW | Transmit attach request signal to 3G NW or another PLMN →LTE function OFF, in success →transmit to LTE in failure |

As represented in Table 1, when the mobile communication terminal 30 receives the attach rejection signal in which the new Cause value "#AA" is set, the mobile communication terminal 30 is configured to transmit the attach request signal to the 3G network, with the LTE function of the mobile communication terminal 30 being valid, regardless of the terminal setting. When the location registration process in the 3G network is successful, the mobile communication terminal 30 is configured to invalidate the LTE function of the mobile communication terminal 30 for a certain period of time. Conversely, the location registration process in the 3G network is not successful, the mobile communication terminal 30 is configured to transmit the attach request signal to the LTE network. It is to be noted that instead of the 3G network, the mobile communication terminal 30 may give a location registration request to another PLMN with which the mobile communication terminal 30 can communicate.

When the mobile communication terminal 30 receives the attach rejection signal in which the Cause value "#15" is set, the mobile communication terminal 30 is configured to give a location registration request to the 3G network, regardless of the terminal setting. In this situation, without invalidating the LTE function of the mobile communication terminal 30, only the use of the tracking area TA corresponding to the location of presence of the mobile communication terminal 30 is disabled. The case of receiving the attach rejection signal in which the Cause value "#15" is set is a case where there is no appropriate coverage cell in the tracking area TA of the LTE network 10 so that the mobile communication terminal 30 can be located in. For example, there is a case where no LTE loaming agreement is established between a communication carrier of a loaming-in user and a communication carrier providing the LTE network 10. In this case, regardless of whether a network failure occurs in the LTE network 10, the location registration process in the LTE network 10 cannot be carried out. Therefore, the attach rejection signal in which the Cause value "#AA" is set is not transmitted to the loaming-in user who is roaming in the communication carrier without an LTE loaming agreement. When the mobile communication terminal 30 receives the attach rejection signal in which the Cause value "#19" is set, the location registration request is given to the 3G network after the LTE function is invalidated for a certain period of time, in the case where the terminal setting is the "voice priority", whereas the location registration request to the LTE network is given again, in the case where the terminal setting is the "data priority".

(Location Information Registration Method)

Hereinafter, a location information registration method of the mobile communication terminal 30 in the present embodiment will be described.

As described above, in the first embodiment, the new "Cause value" is defined in addition to the "Cause value" conventionally regulated. It is supposed that the terminal setting of the mobile communication terminal 30 is the "voice priority". It is to be noted that when the registration of the location information of the mobile communication terminal 30 is completed in the LTE network, its description will be omitted, since the operation is same as the operation regulated conventionally.

(Location Registration Operation of Mobile Communication Terminal)

Based on FIG. 3 and FIG. 4, a description will be given of an operation of the mobile communication terminal 30, when the mobile communication terminal 30 receives from the MME 12 the attach rejection signal in which the new Cause value "#AA" is set.

Figure 3:
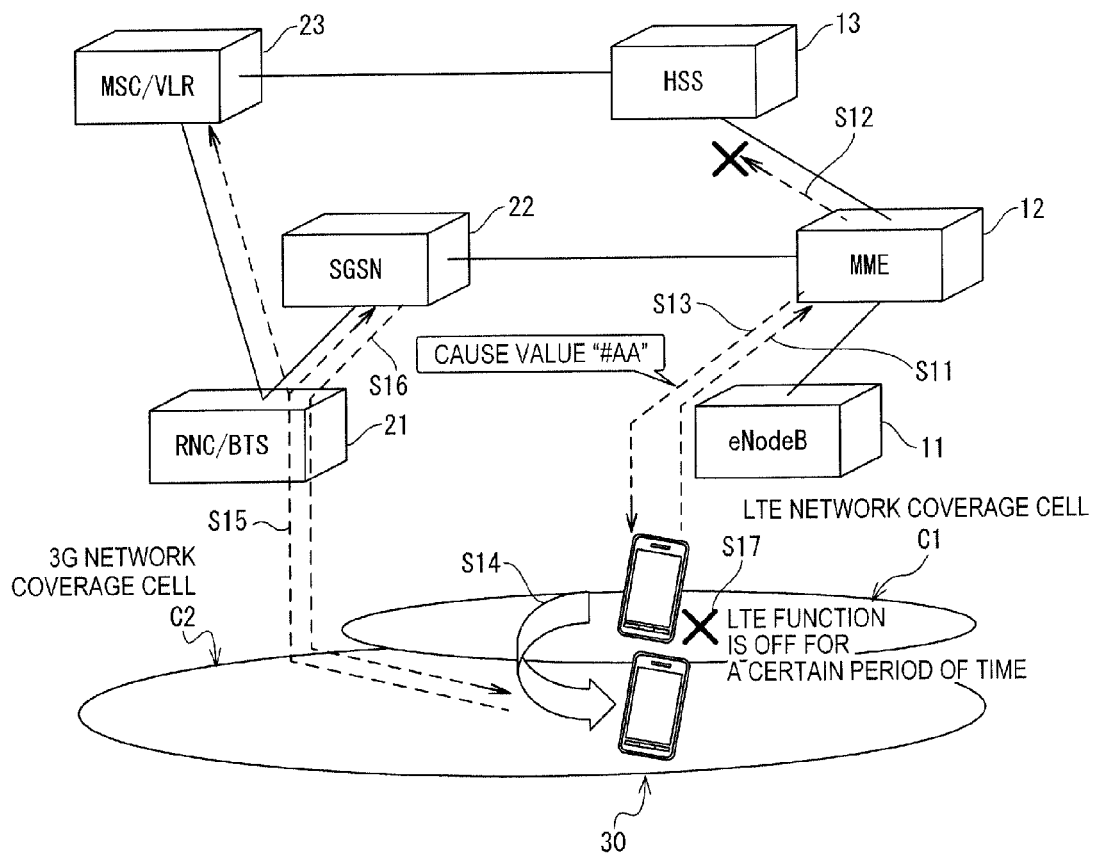
FIG. 3 is a schematic view illustrative of a location information registration method in the first embodiment of the present invention.

FIG. 3 is a view illustrative of an operation of the mobile communication terminal 30, when the location registration process of the mobile communication terminal 30 in the 3G network is completed, after the location registration process of the mobile communication terminal 30 in the LTE network is rejected.

Firstly, the mobile communication terminal 30 transmits the attach request signal to the MME 12 through the eNodeB 11 (step S11). At this timing, the mobile communication terminal 30 transmits the terminal identification information of the mobile communication terminal 30 together with the attach request signal. Next, when the MME 12 receives the attach request signal and the terminal identification information from the mobile communication terminal 30, the MME 12 transmits the attach request signal and the terminal identification information to the HSS 13 (step S12). When the location registration process based on the attach request signal that has been transmitted to the HSS 13 in step S12 is not completed by a network failure, in the MME 12, an appropriate Cause value to be set to the attach rejection signal is selected. Subsequently, the MME 12 sets a new Cause value "#AA" to the attach rejection signal, and transmits the attach rejection signal to the mobile communication terminal 30 through the eNodeB 11 (step S13).

When the mobile communication terminal 30 receives the attach rejection signal as a location registration response signal from the MME 12, the mobile communication terminal 30 selects the operation of the mobile communication terminal 30 based on the Cause value set in the attach rejection signal and the terminal setting of the mobile communication terminal 30. The mobile communication terminal 30 switches the destination mobile communication network to the 3G network 20, as represented in Table 1 (step S14), and the mobile communication terminal 30 transmits the attach request signal to the SGSN 22 and the MSC/VLR 23 of the 3G network 20 (step S15). At this timing, the mobile communication terminal 30 transmits the attach request signal to the 3G network 20 with the LTE function of the mobile communication terminal 30 being valid. When the location registration in the 3G network is completed, the SGSN 22 transmits a location registration completion notification to the mobile communication terminal 30 through the RNC/BTS 21 (step S16). When the mobile communication terminal 30 determines that the location registration process of the mobile communication terminal 30 is completed in the 3G network 20, the LTE function of the mobile communication terminal 30 is invalidated for a certain period of time (step S17).

Figure 4:
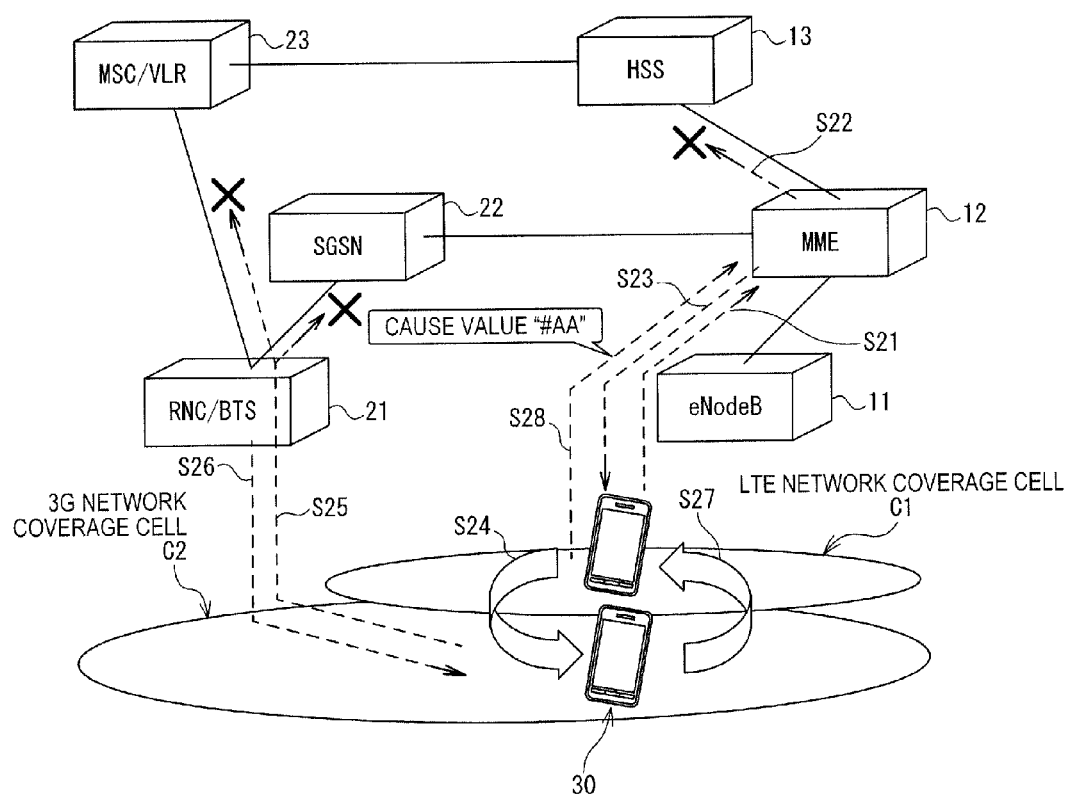
FIG. 4 is a schematic view illustrative of a location information registration method in the first embodiment of the present invention.

FIG. 4 is a view illustrative of an operation of the mobile communication terminal 30, when the location registration process of the mobile communication terminal 30 in the 3G network is also rejected, after the location registration process of the mobile communication terminal 30 in the LTE network is rejected.

It is to be noted that since steps S21 to S25 illustrated in FIG. 4 are same operations with steps S11 to S15 that have been described based on FIG. 3, the descriptions thereof will be omitted.

Although the attach request signal is transmitted to the 3G network 20 in step S25, there is a case where the location registration in the 3G network is not completed by a network failure. In this case, the RNC/BTS 21 transmits a handover instruction to the LTE network, as a location registration response signal to the mobile communication terminal 30 (step S26). When the mobile communication terminal that has not been able to make a location registration in the 3G network has an LTE function, the RNC/BTS 21 is configured to transmit the handover instruction to the LTE network to the mobile communication terminal. The mobile communication terminal 30 that has received the handover instruction switches the destination mobile communication network to the LTE network 10, and transmits the attach request signal to the MME 12 of the LTE network 10, as illustrated in step S28 (step S27). The subsequent operations of the mobile communication terminal 30 are selected each time in accordance with the location registration response signal replied from the MME 12.

When the destination mobile communication network to which the location registration request is given is switched to the 3G network 20 from the LTE network 10, conventionally, the LTE function of the mobile communication terminal 30 is invalidated for a certain period of time. For this reason, even while an access failure is occurring in the 3G network 20 for a long time, the attach request signal cannot be transmitted for a certain period of time to the LTE network 10, which has a possibility of network recovery.

In the present embodiment, on the other hand, as a location registration operation of the mobile communication terminal 30 with the new Cause value "#AA", which is different from the existing Cause value regulated in the 3GPP standardization specifications, the above-described new operation is defined. Accordingly, when an access failure is occurring for a long time in the 3G network 20 that overlays the LTE network 10 in which an intermittent network failure occurs, it is possible to set back the destination mobile communication network of the mobile communication terminal 30 to the LTE network 10 having a possibility of network recovery. In addition, a new location registration operation can be defined without changing an existing regulation in the 3GPP standardization specifications. Therefore, an influence to the existing regulation in the 3GPP standardization specifications can be reduced.

In the LTE network 10, in some cases, a phenomenon such as a failure that causes the attach rejection recovers immediately. In addition, in the LTE network 10, plural units including the MME 12, the S-GW 14, and the P-GW 15 cover the same area together. Therefore, by the mobile communication terminal 30 performing a location registration request again, the location registration is completed, in some cases.

Thus, in the location information registration method in the present embodiment, it is easy to avoid the unavailable state for a long time in the location registration of the mobile communication terminal 30. Once the location information of the mobile communication terminal 30 having the LTE function is registered in the LTE network 10, the mobile communication terminal 30 is capable of ensuring the packet communication at least.

In addition, in the first embodiment, when the mobile communication terminal 30 receives the attach rejection signal in which the new Cause value "#AA" is set, the mobile communication terminal 30 transmits the attach request signal to the 3G network 20 with the LTE function of the mobile communication terminal 30 being valid. Accordingly, while an access failure is occurring in the 3G network 20 for a long time, the destination mobile communication network of the mobile communication terminal 30 can be set back promptly to the LTE network having a possibility of network recovery. Therefore, it is easy to avoid the unavailable state for a long time in the location registration of the mobile communication terminal.

Further, in the first embodiment, after the location information of the mobile communication terminal 30 is registered in the 3G network 20, the LTE function of the mobile communication terminal 30 is invalidated for a certain period of time. Accordingly, even if a communication network device of the 3G network 20 makes a request of handover to the LTE network 10 to the mobile communication terminal 30, it is possible for the mobile communication terminal 30 not to make a connection request to the LTE network 10 having a high possibility that a network failure is occurring.

It is to be noted that instead of the LTE network 10 described in the first embodiment, a VoLTE network in which voice communication is available over the LTE network may be formed. In this case, even if an access failure is occurring in the 3G network for a long time, when the location information of the mobile communication terminal 30 is registered in the VoLTE network by giving a request of the location registration again, the mobile communication terminal 30 is capable of ensuring both of the voice communication and the packet communication. Further, instead of the 3G network, the location registration request may be given to another PLMN with which the mobile communication terminal 30 can communicate.

Moreover, although the LTE network 10 is formed in the location of presence of the mobile communication terminal 30, the above-mentioned location registration operation is applicable to a case where the 3G network or another PLMN is not formed.

When there is no mobile communication network that overlays LTE network 10, the mobile communication terminal 30 that has received the attach rejection signal in which the Cause value "#AA" is set is configured to search for another mobile communication network such as a 3G network in order to transmit the attach request signal. However, since there is no mobile communication network that overlays, the mobile communication terminal 30 determines that the location registration in another mobile communication network is not completed, and transmits the attach registration request to the LTE network 10.

As described above, even in a case where another mobile communication network to overlay the LTE network 10 has an access failure for a long time, or there is no another mobile communication network, it is possible to transmit the attach registration request to the LTE network 10 again promptly.

2. Second Embodiment

A location information registration method in a second embodiment of the present invention will be described. In the second embodiment, a description will be given of an example of the MME 12 described in the first embodiment, which is configured to determine a Cause value set in the attach rejection signal in accordance with the terminal identification information of the mobile communication terminal 30 that has given the location registration request.

It is to be noted that the configuration of the location information registration system to which a location information registration method in the second embodiment is applied is same as the configuration of the location information registration system 1 that has been described in the first embodiment.

(Determination Method of Cause Value in MME)

Figure 5:
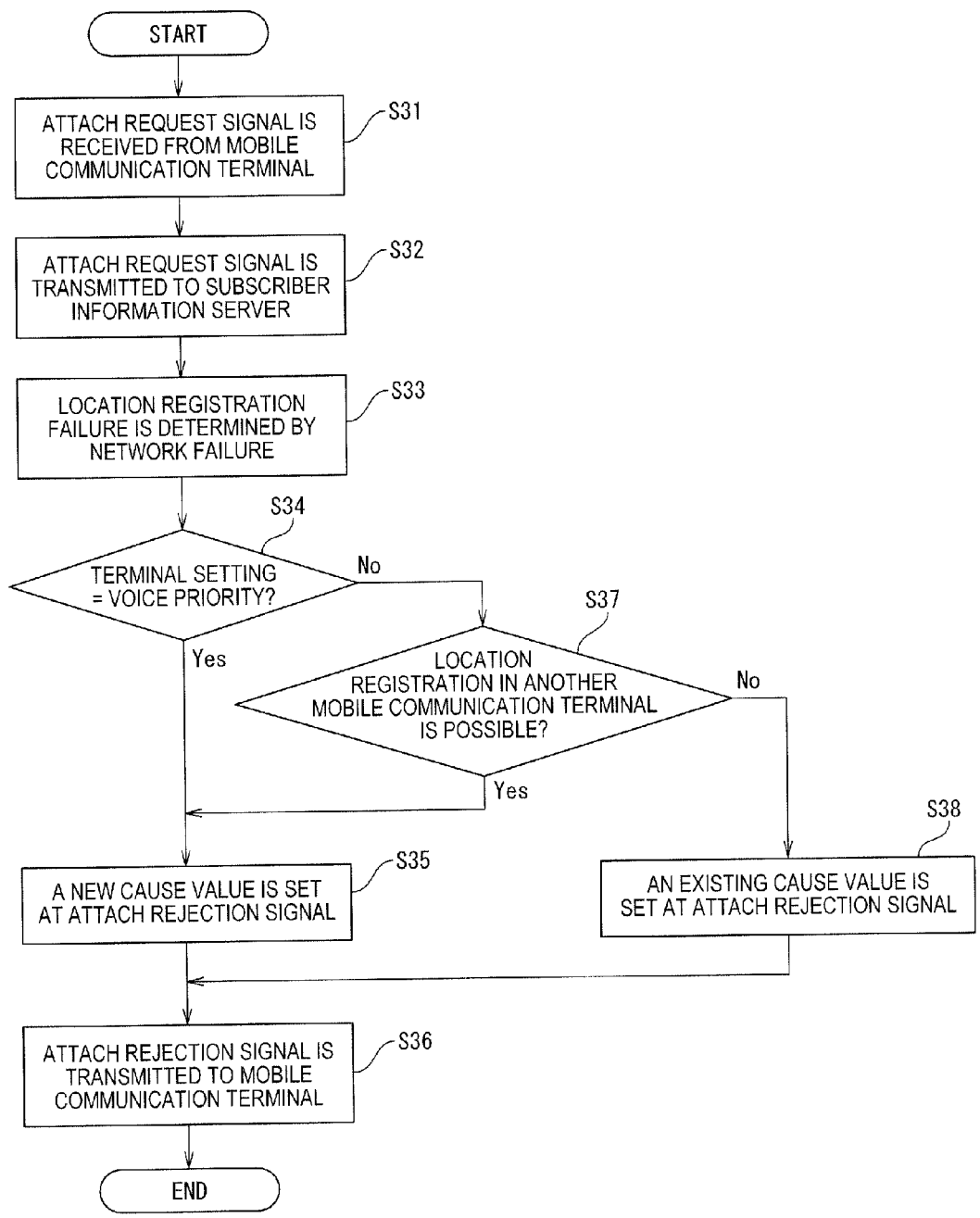
FIG. 5 is a flow chart illustrative of a location information registration method in a second embodiment of the present invention.

FIG. 5 is a flow chart illustrative of a first method of determining, by the MME 12, the Cause value in accordance with the terminal identification information of the mobile communication terminal 30 that has given the location registration request. It is to be noted that FIG. 5 is a flow chart illustrative of a case where the location registration process cannot be completed by a network failure. In addition, the MME 12 is configured to determine the Cause value between the step S12 described in the first embodiment (step S32 of FIG. 5) and the step S13 described in the first embodiment (step S36 of FIG. 5).

The MME 12 receives the attach request signal transmitted to the LTE network 10 from the mobile communication terminal 30 (step S31), and the MME 12 transmits the attach request signal to the HSS 13 (step S32). After that, the MME 12 determines that the location registration process of the mobile communication terminal 30 is not completed, because the MME 12 cannot receive a location registration response signal from the HSS 13 because of a network failure (step S33). Then, as illustrated in step S34, it is determined whether or not the terminal setting of the mobile communication terminal 30 that has not completed the location registration is the "voice priority". The terminal setting is determined based on the terminal identification information (IMEI, IMEISV, or the like) received with the attach request signal from the mobile communication terminal 30. In step S34, when it is determined that the terminal setting is the voice priority, the process goes to step S35. In this case, in step S35, in order to complete the location registration process of the mobile communication terminal 30 as soon as possible, the MME 12 sets "#AA" as the Cause value in the attach rejection signal. Lastly, in step S36, the MME 12 transmits the attach rejection signal to the mobile communication terminal 30.

When it is not determined that the terminal setting is the voice priority (that is, the terminal setting is the data priority or unknown) in step S34, the process goes to step S37. In step S37, it is determined whether or not the mobile communication terminal 30 can make a location registration in the 3G network 20, which is another mobile communication device. In step S34, it is determined that the terminal setting of the mobile communication terminal 30 is the "data priority". Therefore, in the mobile communication terminal 30, staying in the LTE network 10 having a high throughput is defined as a policy. For this reason, when it is determined that the location registration of the mobile communication terminal 30 may be made in the 3G network 20 having a throughput lower than the LTE network 10, the process goes to step S35, and the Cause value "#AA" is set in the attach rejection signal. Lastly, in step S36, the MME 12 transmits the attach rejection signal to the mobile communication terminal 30. In step S37, when it is not determined that the location registration of the mobile communication terminal 30 may be made in the 3G network 20, the process goes to step S38, and the existing Cause value (for example, "#19") is set in the attach rejection signal. Lastly, in step S36, the MME 12 transmits the attach rejection signal to the mobile communication terminal 30.

As described above, it is possible to uniquely set the Cause value to be used based on the terminal identification information of the mobile communication terminal 30. Accordingly, by the MME 12 playing a leading role, it is made possible for the mobile communication terminal 30 to perform an appropriate location registration operation depending on the type of the terminal.

Figure 6:
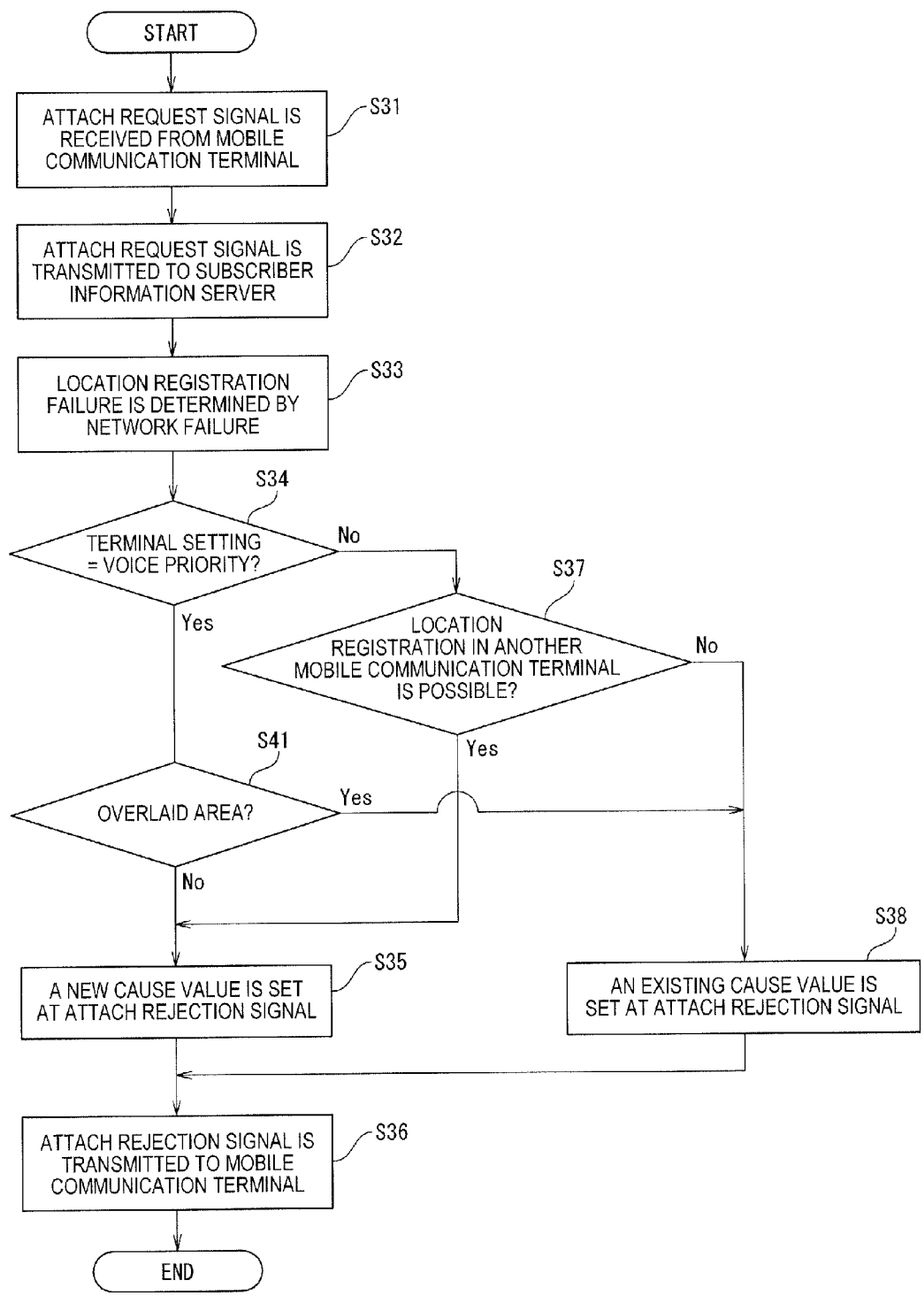
FIG. 6 is a flow chart illustrative of the location information registration method in the second embodiment of the present invention.
Figure 7:
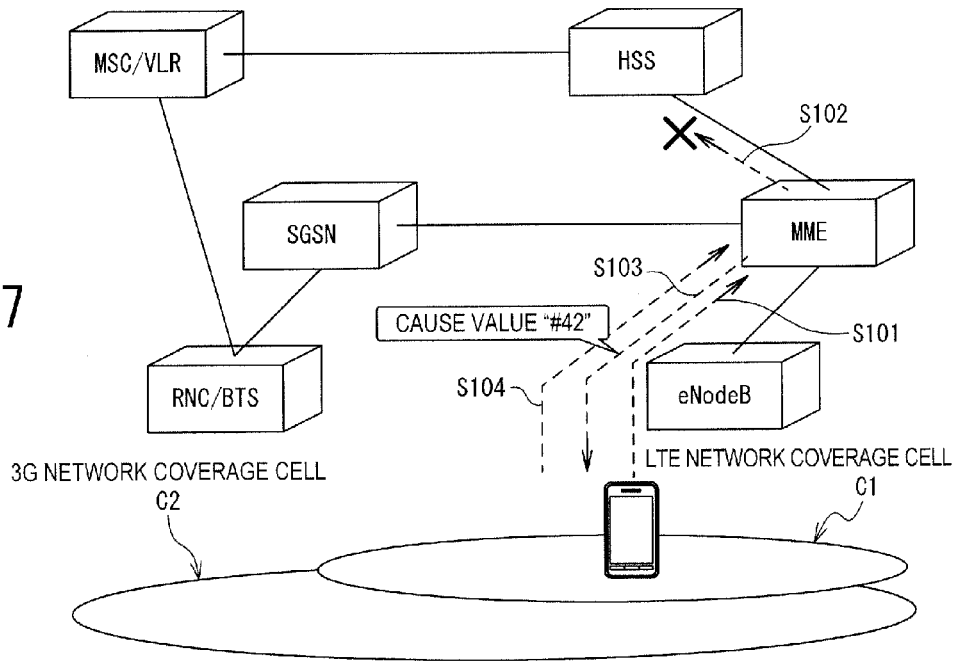
FIG. 7 is a flow chart illustrative of a conventional location information registration method.
Figure 8:
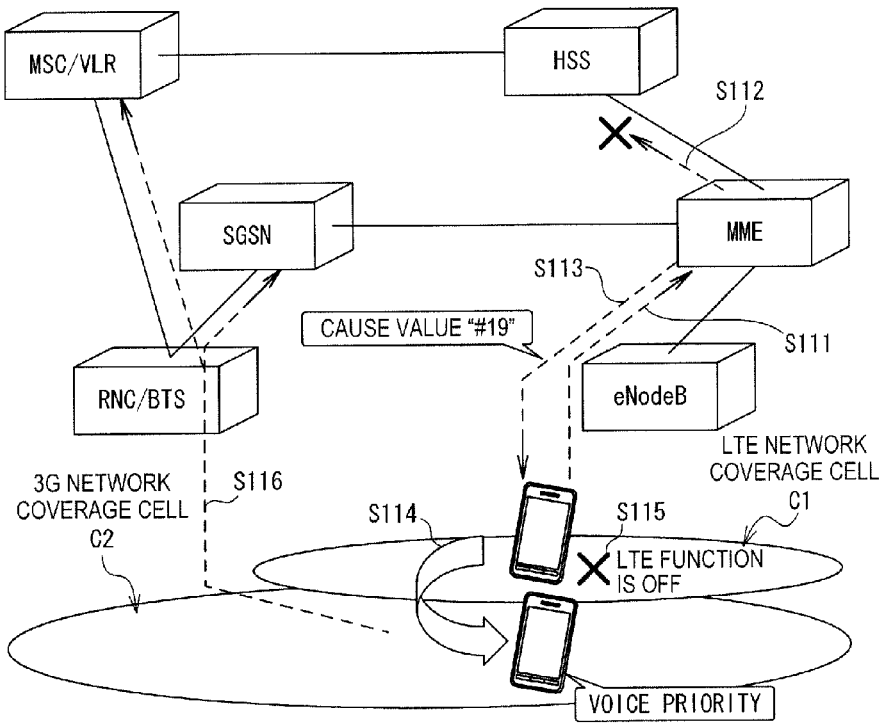
FIG. 8 is a flow chart illustrative of a conventional location information registration method.
Figure 9:
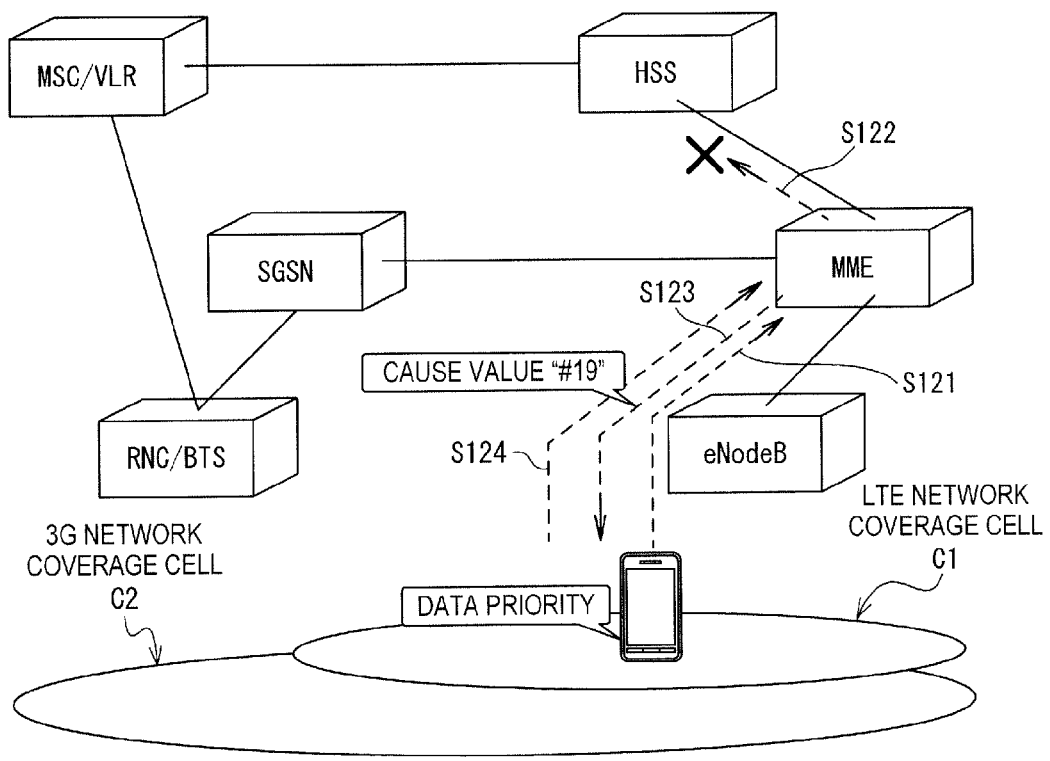
FIG. 9 is a flow chart illustrative of a conventional location information registration method.

FIG. 6 is a flow chart illustrative of a second method of determining, by the MME 12, the Cause value in accordance with the terminal identification information of the mobile communication terminal 30 that has given the location registration request. In the second method, the terminal setting of the mobile communication terminal 30 is the "voice priority" and in the location of presence of the mobile communication terminal 30, a new Cause value "#AA" is set in a case where the coverage area cell C2 of the 3G network 20 does not overlay the coverage area cell C1 of the LTE network 10.

In step S31 to step S38 illustrated in the flow chart of FIG. 6, the processes same with step S31 to step S38 in FIG. 5 are performed. In addition, the MME 12 determines whether or not there is an overlay of the coverage area cell C2 between step S34 and step S35 illustrated in the flow chart of FIG. 5 (step S41). In step S34, when it is determined that the terminal setting of the mobile communication terminal 30 is the "voice priority", the process goes to step S41.

In step S41, it is determined whether or not the coverage area cell C2 of the 3G network 20 overlays the coverage area cell C1 of the LTE network 10. When it is determined that there is no coverage area cell C2 that overlays, the Cause value "#AA" is set to the attach rejection signal in step S35. Lastly, in step S36, the MME 12 transmits the attach rejection signal to the mobile communication terminal 30.

Also, in step S41, when it is determined that there is the coverage area cell C2 of the 3G network 20 overlays the coverage area cell C1 of the LTE network 10, the existing Cause value (for example, "#19") is set in the attach rejection signal in step S38. Lastly, in step S36, the MME 12 transmits the attach rejection signal to the mobile communication terminal 30.

As described above, it is possible to set the Cause value to be used uniquely based on the overlaid state of the coverage area cell and the terminal identification information of the mobile communication terminal 30. Accordingly, by the MME 12 playing a leading role, it is possible for the mobile communication terminal 30 to perform an appropriate location registration operation depending on the type of the terminal.

3. Third Embodiment

A location information registration method in a third embodiment of the present invention will be described. In the third embodiment, instead of using the new Cause value "#AA" defined in the first embodiment, a description will be given of an example of changing the location registration operation corresponding to the existing Cause value to a new location registration operation of the mobile communication terminal 30.

In the third embodiment, in a case where the terminal setting of the mobile communication terminal 30 is the "voice priority" and the mobile communication terminal 30 receives the attach request rejection signal in which the conventionally regulated Cause value "#19" is set, an operation regulation of the mobile communication terminal 30 is changed so that the location registration operation when the Cause value "#AA" described in the first embodiment is received should be performed.

Following Table 2 represents the location registration operation of the mobile communication terminal 30, which is determined based on the "Cause value" set in the attach rejection signal and the terminal setting of the mobile communication terminal 30, in the second embodiment. The Cause value "#15" represented in Table 2 is a Cause value conventionally used, and is also regulated in non-patent literature 1. In addition, the Cause value "#19" represented in Table 2 is the Cause value conventionally used, but the existing location registration operation corresponding to the Cause value "#19" is partially changed to the location registration operation when the Cause value "#AA" described in the first embodiment is received. In addition, in the third embodiment, the new Cause value "#AA" described in the first embodiment is not used.

TABLE 2

| | Cause value of attach rejection signal transmitted from MME | |
|---|---|---|
| Terminal setting | #15 (no suited cell in TA) | #19 (no response, general error) |
| Voice Priority | Transmit attach request signal to 3G NW | Transmit attach request signal to 3G NW or another PLMN →LTE function OFF, in success →transmit to LTE in failure |
| Data Priority | Transmit attach request signal to 3G NW | Transmit attach request signal to LTE NW |

As represented in table 2, in a case where the mobile communication terminal 30 receives the attach rejection signal in which the Cause value "#19" is set and the terminal setting is the "voice priority", the mobile communication terminal 30 is configured to transmit the attach request signal to the 3G network with the LTE function of the mobile communication terminal 30 being valid. When the location registration process is successful in the 3G network, the mobile communication terminal 30 is configured to invalidate the LTE function of the mobile communication terminal 30 for a certain period of time. In contrast, when the location registration process is not successful in the 3G network, the mobile communication terminal 30 is configured to transmit the attach request signal to the LTE network.

It is to be noted that the above-described location registration operation is applicable to a case where the mobile communication terminal 30 with the terminal setting being the "voice priority" receives the attach rejection signal in which a Cause value other than the Cause value "#19" indicating that the location registration process is rejected because of a network failure is set.

It is to be noted that instead of the LTE network, the location registration request may be given to the VoLTE network in which the voice communication is available over the LTE network, and instead of the 3G network, the location registration request may be given to another PLMN over which the mobile communication terminal 30 can communicate.

In addition, when the terminal setting of the mobile communication terminal 30 is the "data priority", the mobile communication terminal 30 is configured to perform the location registration operation conventionally regulated.

In the location registration method in the third embodiment, it is possible to handle the new location registration operation, by partially changing the existing operation regulation on the mobile communication terminal 30 side, without defining a new Cause value on the MME 12 side.

4. Fourth Embodiment

A location information registration method in a fourth embodiment of the present invention will be described. In the fourth embodiment, a description will be given of an example of defining a new location registration operation of the mobile communication terminal 30 by setting a new terminal setting different from the "voice priority" or the "data priority", instead of using the new Cause value "#AA" defined in the first embodiment.

In the fourth embodiment, as the terminal setting, "super voice priority" defined as a policy so that the incoming voice call is made available more immediately than the "voice priority". In the fourth embodiment, in a case where the terminal setting of the mobile communication terminal 30 is the "super voice priority" and the mobile communication terminal 30 receives the attach request rejection signal in which the Cause value "#19" that has been conventionally regulated is set, the mobile communication terminal 30 is configured to change the operation regulation so as to perform the location registration operation in receiving the Cause value "#AA" described in the first embodiment. In the fourth embodiment, in the mobile communication terminal 30 in which the "voice priority" and the "data priority" are set as the terminal settings, the location registration operation conventionally regulated is performed.

Following Table 3 represents the location registration operation of the mobile communication terminal 30 in the fourth embodiment, which is determined based on the "Cause value" set in the attach rejection signal and the terminal settings of the mobile communication terminal 30. The Cause values "#15" and "#19" represented in Table 3 are conventionally used, and are regulated in the non-patent literature 1. In the fourth embodiment, the location registration operation of the mobile communication terminal 30 in which the terminal setting is the "super voice priority" is newly defined. In addition, in the fourth embodiment, the Cause value "#AA" described in the first embodiment is not used.

TABLE 3

| | Cause value of attach rejection signal transmitted from MME | |
|---|---|---|
| Terminal setting | #15 (no suited cell in TA) | #19 (no response, general error) |
| Voice Priority | Transmit attach request signal to 3G NW | LTE function OFF, and transmit attach request signal to 3G NW |
| Data Priority | Transmit attach request signal to 3G NW | Transmit attach request signal to LTE NW |
| Super Voice Priority | Transmit attach request signal to 3G NW | Transmit attach request signal to 3G NW or another PLMN →LTE function OFF, in success →transmit to LTE in failure |

As represented in Table 3, in a case where the mobile communication terminal 30 receives the attach rejection signal in which the Cause value "#19" is set and the terminal setting is the "super voice priority" newly defined, the mobile communication terminal 30 is configured to transmit the attach request signal to the 3G network with the LTE function of the mobile communication terminal 30 being valid. When the location registration process is successful in the 3G network, the mobile communication terminal 30 is configured to invalidate the LTE function of the mobile communication terminal 30 for a certain period of time. In contrast, when the location registration process is not successful in the 3G network, the mobile communication terminal 30 is configured to transmit the attach request signal to the LTE network.

The above-mentioned location registration operation is applicable to a case where the mobile communication terminal 30 in which the terminal setting is the "super voice priority" receives the attach rejection signal in which a Cause value other than the Cause value "#19" indicating that the location registration process is rejected because of a network failure is set.

It is to be noted that instead of the LTE network, the location registration request may be given to the VoLTE network in which the voice communication is available over the LTE network, and instead of the 3G network, the location registration request may be given to another PLMN over which the mobile communication terminal 30 can communicate. The terminal setting of the "super voice priority" may be set at a VoLTE-supporting mobile communication terminal, in particular.

In addition, when the terminal settings of the mobile communication terminal 30 are the "voice priority" and the "data priority", the mobile communication terminal 30 is configured to perform the location registration operation conventionally regulated.

In the location registration method in the fourth embodiment, it is possible to handle the new location registration operation, by adding new terminal setting and operation regulation on the mobile communication terminal 30 side, without defining a new Cause value on the MME 12 side.

As described above, the new Cause value "#AA" defined in the first and second embodiments and the new location registration operation of the mobile communication terminal defined in the first to fourth embodiments may be applicable to various kinds of communication carriers, mobile communication terminals, and location registration systems.

It is to be noted that the above-described new Cause value "#AA" can be set for the location registration response signal including both of the location registration rejection signal and the location registration completion signal.

Accordingly, it is possible to solve the problem that the location registration cannot be performed in any communication network for a long time, which occurs in a case where the existing Cause value and the existing location registration operation regulated in the 3GPP standardization specifications are applied.

In particular, as compared with facilities of the LTE network to which an LTE-supporting terminal is connected in priority, the facility installation situation of the conventional 3G network is superior. Therefore, when it is difficult to make a location registration in the LTE network caused by an occurrence of network failure, the location registration can be made in the 3G network having facilities. There are circumstances that after invalidating the LTE function, the location registration in the 3G network can be done. Besides, also in consideration of the fact that the handover from the 3G network to the LTE network in which a trouble is occurring can be suppressed, the location registration in the 3G network can be made after invalidating the LTE function.

However, in a state where the facility installation of the LTE network makes progress as compared to the 3G network, it is considered that the measures to avoid a network failure in the LTE network will be dominant as compared to the measures to avoid a network failure in the 3G network. For this reason, it is also considered that a balance with the facility installation situation or the like will cause a problem that cannot be imagined ever or the most suited mobile communication method can be changed. According to the present invention, the problems that cannot be solved by the existing operations regulated in the 3GPP standardization specifications can be solved by defining a new location registration operation.

The present invention can be realized as a computer program. For example, the function of each part of the location information operation device can be realized as a communication program. Accordingly, a part or all of the present invention can be incorporated into hardware or software (including firm-ware, resident software, microcode, state machine, gate array, or the like). Further, the present invention can be realized in a form of a computer program product on a computer-usable or computer-readable memory medium, and computer-usable or computer-readable program codes are incorporated into the medium. In accordance with the context of the present specification, a computer-usable or computer-readable memory medium can be configured with any medium that can record, store, communicate, transmit, or carry a program in an instruction execution system, unit, or device.

The scope of the present invention is not limited to exemplary embodiments, which have been illustrated and described. All embodiments that bring equivalent advantages to which the present invention is directed are also included. Further, the scope of the present invention is not limited to combinations aimed by claims, Every desired combination of particular ones of all features disclosed herein.

REFERENCE SIGNS LIST 1 location information registration system
10 LTE network
11 eNodeB
12 MME
13 HSS
14 S-GW
15 P-GW
20 3G network
21 RNC/BTS
22 SGSN
23 MSC/VLR
30 mobile communication terminal
30a communication unit
30b terminal setting holder
30c location information registration request unit

The invention claimed is:

1. A location information registration method, comprising:
   transmitting, by a mobile communication terminal, a location registration request signal of making a registration request of location information of the mobile communication terminal, to a first mobile communication network over which the mobile communication terminal can communicate;
   transmitting to the mobile communication terminal, by a first mobile management node, the location registration request signal to a first subscriber server connected with the first mobile communication network, when the first mobile management node connected with the first mobile communication network receives the location registration request signal;
   transmitting, by the first mobile management node, a first location registration response signal in which a predefined value indicative of a cause of rejecting the registration request of the location information is set, when the first mobile management node determines that a registration of the location information of the mobile communication terminal cannot be completed;
   transmitting, by the mobile communication terminal, the location registration request signal of the mobile communication terminal to a second mobile communication network based on the predefined value, when the mobile communication terminal receives the first location registration response signal in which the predefined value is set and when there is the second mobile communication network over which the mobile communication terminal can communicate; and
   carrying out a first location registration operation of retransmitting the location registration request signal to the first mobile communication network, when there is not the second mobile communication network or when it is determined that a location registration of the mobile communication terminal in the second mobile communication network is not completed.

2. The location information registration method according to claim 1, wherein in receipt of the first location registration response signal, the mobile communication terminal transmits the location registration request signal of the mobile communication terminal to the second mobile communication network, with a communication function of the mobile communication terminal for communicating with the first mobile communication network being valid.

3. The location information registration method according to claim 2, wherein in receipt of the first location registration response signal, the mobile communication terminal transmits the location registration request signal to the second mobile communication network, and when it is determined that the location registration of the mobile communication terminal in the second mobile communication network is completed, the mobile communication terminal invalidates the communication function of the mobile communication terminal for communicating with the first mobile communication network for a certain period of time.

4. The location information registration method according to claim 1, wherein when a voice communication is set in priority in a terminal setting of the mobile communication terminal, the first location registration operation is carried out, and when the voice communication is not set in priority in the terminal setting of the mobile communication terminal, a second location registration operation of transmitting the location registration request signal to the first mobile communication network is carried out, instead of the first location registration operation, without the mobile communication terminal transmitting the location registration request signal to the second mobile communication network.

5. The location information registration method according to claim 4, wherein:
either the first location registration operation or the second location registration operation is selected based on the predefined value set in the first location registration response signal and the terminal setting, and
the predefined value used for making the mobile communication terminal select the first location registration operation is another predefined value, which is different from the predefined value used for making the mobile communication terminal select the second location registration operation.

6. A mobile communication terminal communicating with at least a first mobile communication network, the mobile communication terminal comprising:
a communication unit configured to transmit to a first mobile communication network a location registration request signal of making a registration request of location information of the mobile communication terminal, and to receive a location registration response signal indicative of a registration state of the location information; and
a location information registration request unit configured to transmit the location registration request signal of the mobile communication terminal to a second mobile communication network based on a predefined value, when it is determined that the location registration response signal is a first location registration response signal in which the predefined value is set as a value indicative of a cause of rejecting a registration process of the location information, and when there is the second mobile communication network over which the mobile communication terminal can communicate, and configured to carry out a first location registration operation of retransmitting the location registration request signal to the first mobile communication network, when it is determined that there is not the second mobile communication network or a location registration of the mobile communication terminal is not completed in the second mobile communication network.

7. The mobile communication terminal according to claim 6, wherein when the communication unit receives the first location registration response signal, the location information registration request unit is configured to transmit the location registration request signal of the mobile communication terminal to the second mobile communication network, with a communication function of the mobile communication terminal for communicating with the first mobile communication network being valid.

8. The mobile communication terminal according to claim 7, wherein when the communication unit receives the first location registration response signal, the location information registration request unit is configured to transmit the location registration request signal to the second mobile communication network, and to invalidate the communication function of the mobile communication terminal for communicating with the first mobile communication network for a certain period of time, when it is determined that the location registration of the mobile communication terminal in the second mobile communication network is completed.

9. The mobile communication terminal according to claim 7, wherein the location information registration request unit is configured to determine a transmission destination of the location registration request signal based on the predefined value set in the first location registration response signal and a terminal setting of a communication form to be communicated in priority, which is set in the mobile communication terminal.

10. The mobile communication terminal according to claim 9, wherein the location information registration request unit is configured to carry out the first location registration operation, when determining that the terminal setting is a setting of a voice call communication in priority, and the location information registration request unit is configured to carry out a second location registration operation of transmitting the location registration request signal to the first mobile network, instead of the first location registration operation, without transmitting the location registration request signal to the second mobile communication network, when it is not determined that the terminal setting is the setting of the voice call communication in priority.

* * * * *